US011434100B2

(12) United States Patent
Bednarczyk et al.

(10) Patent No.: US 11,434,100 B2
(45) Date of Patent: Sep. 6, 2022

(54) APPARATUS AND METHOD FOR WINDING TAIL SECTION OF OPTICAL FIBER CABLE ONTO A SPOOL

(71) Applicant: CORNING RESEARCH & DEVELOPMENT CORPORATION, Corning, NY (US)

(72) Inventors: David Andrew Bednarczyk, Wilmington, NC (US); Korey Shad Hite, Wilmington, NC (US); Randall Thomas Reilly, Hampstead, NC (US); Gregory Bryan Teets, Leland, NC (US); Ryan Neal Thornton, Wilmington, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/174,447

(22) Filed: Feb. 12, 2021

(65) Prior Publication Data

US 2021/0163253 A1 Jun. 3, 2021

Related U.S. Application Data

(63) Continuation of application No. PCT/US2019/047074, filed on Aug. 19, 2019.

(Continued)

(51) Int. Cl.
*B65H 54/34* (2006.01)
*B65H 65/00* (2006.01)
(Continued)

(52) U.S. Cl.
CPC ........... *B65H 54/343* (2013.01); *B65H 54/42* (2013.01); *B65H 65/00* (2013.01); *G02B 6/4486* (2013.01); *B65H 2701/32* (2013.01)

(58) Field of Classification Search
CPC ...... B65H 54/343; B65H 54/42; B65H 65/00; B65H 2701/32
See application file for complete search history.

(56) References Cited

U.S. PATENT DOCUMENTS 3,625,448 A 12/1971 Griffiths
4,542,862 A 9/1985 Romike et al.
(Continued)

FOREIGN PATENT DOCUMENTS

EP 0514858 A2 11/1992
EP 1242802 A1 9/2002
(Continued)

OTHER PUBLICATIONS

International Search Report and Written Opinion of the International Searching Authority; PCT/US19/47074; dated Nov. 11, 2019; 12 Pages; European Patent Office.

*Primary Examiner* — William E Dondero
(74) *Attorney, Agent, or Firm* — William D. Doyle

(57) ABSTRACT

Embodiments of a method of collecting a tail section of a long product, such as an optical fiber cable, are provided. In the method, a lead wire from a tail spool is unwound, and the lead wire is fed through a flange of a main spool. The tail spool and the main spool have a common rotation axis. The lead wire is attached to the long product. The tail spool is rotated while holding the main spool stationary so as to wind the lead wire and the tail section onto the tail spool. The rotation of the tail spool is stopped, and the main spool and the tail spool are rotated together so as to wind the long product onto the main spool. Also provided are embodiments of a winding apparatus using the tail spool and a tail reel that includes the tail spool and a drive mechanism.

17 Claims, 4 Drawing Sheets

Related U.S. Application Data

(60) Provisional application No. 62/720,186, filed on Aug. 21, 2018.

(51) Int. Cl.
    *B65H 54/42* (2006.01)
    *G02B 6/44* (2006.01)

(56) References Cited

U.S. PATENT DOCUMENTS

| | | |
|---|---|---|
| 2009/0139084 A1 | 6/2009 | Franklin et al. |
| 2015/0008275 A1 | 1/2015 | Akamatsu |

FOREIGN PATENT DOCUMENTS

| | | |
|---|---|---|
| JP | 08-327831 A | 12/1996 |
| WO | 2000/040495 A1 | 7/2000 |
| WO | 01/51911 A1 | 7/2001 |

APPARATUS AND METHOD FOR WINDING TAIL SECTION OF OPTICAL FIBER CABLE ONTO A SPOOL

CROSS-REFERENCE TO RELATED APPLICATIONS

This application is a continuation of International Application No. PCT/US2019/047074 filed Aug. 19, 2019, which claims the benefit of priority to U.S. Provisional Application No. 62/720,186, filed on Aug. 21, 2018, the content of each of which is relied upon and incorporated herein by reference.

BACKGROUND

The disclosure relates generally to winding apparatuses and, more particularly, to an apparatus and method useful during the processing of strands, ropes, wires, cables, and other long products that may be stored on a spool. Optical fiber cables are used in the telecommunications industry to transmit data. The optical fiber cables are generally long to extend from node to node within a telecommunications network. During processing and at the end of processing, cable cores and long cables are typically wound onto spools for storage and transportation.

SUMMARY

In one aspect, embodiments of present invention relate to a method of collecting a tail section of a long product, such as an optical fiber cable. In the method, a lead wire from a tail spool is unwound, and the lead wire is fed through a flange of a main spool. The tail spool and the main spool have a common rotation axis. The lead wire is attached to the long product. The tail spool is rotated while holding the main spool stationary so as to wind the lead wire and the tail section of the long product onto the tail spool. The rotation of the tail spool is stopped, and the main spool and the tail spool are rotated together so as to wind the long product onto the main spool.

In another aspect, embodiments of the present disclosure relate to a method of producing an optical fiber cable. In the method, a cable jacket is extruded over a cable core to produce the optical fiber cable. At least a portion of the optical fiber cable is wound onto a tail spool of a winding apparatus. Further, the remainder of the optical fiber cable is wound onto a main spool of the winding apparatus. The main spool and the tail spool have a common axis of rotation on the winding apparatus.

In a further aspect, embodiments of the present disclosure relate to a winding apparatus. The winding apparatus includes a first vertical leg and a second vertical leg spatially disposed from the first vertical leg. A first pintle extends from the first vertical leg towards the second vertical leg, and a second pintle extends from the second vertical leg towards the first vertical leg. The first pintle and the second pintle define an axis of rotation. A main spool is carried on the first pintle and on the second pintle and is configured for rotation about the axis of rotation. A tail spool is carried on the second pintle and is configured for rotation about the axis of rotation. A controller is configured to cause rotation of the tail spool to take up a tail section of an optical fiber cable and to cause rotation of the main spool to take up windings of the optical fiber cable.

In still another aspect, embodiments of the present disclosure relate to a tail reel configured to wind a tail section of a long product. The tail reel includes a tail spool having an outer flange and a drum. The drum extends from a surface of the outer flange. The tail reel also includes a drive mechanism having a drive wheel residing on a slidable mount. The drive wheel is configured to slide into engagement with the outer flange of the tail spool to cause rotation of the tail spool.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Disclosed herein are various embodiments of an apparatus and method for winding a tail section of rope, wire, strand, cable, etc. onto a spool. For ease of discussion, an illustrative embodiment pertaining to optical fiber cables is used throughout. However, as will be understood by a person of ordinary skill in the art from the present disclosure, the apparatus and winding method can be used in any application in which a tail section is preserved (e.g., for testing and/or quality control purposes) outside of a main spool. With respect to the illustrative embodiment of optical fiber cables, various intermediate products, such as a cable core, as well as the finished cable are wound onto a spool during/after production for storage and transport. However, an end section of cable core or cable, referred to as a "tail section," may need to be made available for testing purposes to ensure each cable meets the applicable telecommunications and/or quality control standards. Thus, disclosed herein is a tail spool that operates in conjunction with a main spool on a winding apparatus to wind a tail section of the optical fiber cable. Advantageously, compared to conventional winding processes in which multiple operators had to manage cable being indexed from a capstan in order to secure a tail section, which often led to excess loose fiber building up, the tail spool maintains tautness of the optical fiber cable during winding, limiting excess loose fiber during ramp-up, and the tail spool includes a reusable lead wire to allow ease of feeding the optical fiber cable onto the tail spool and main spool. The embodiments of the apparatus and method for winding a tail section of an optical fiber cable onto a spool disclosed herein are provided by way of example and not by way of limitation.

While the presently disclosed apparatus and method will be discussed in terms of a jacketing line for an optical fiber cable, the winding apparatus and method can also be used in a variety of other intermediate processes involving an optical fiber cable and in a variety of other processes related to ropes, strands, wires, cables, etc. In general, products that may benefit from the tail spool and winding method disclosed herein are long products, i.e., products that have a length that is much greater than their width or thickness. Thus, as used herein, a "long product" is, e.g., rope, strand, wire, cable, string, thread, yarn, ribbon, tape, line, and other similarly long and thin products, including any intermediate products thereof.

Figure 1:
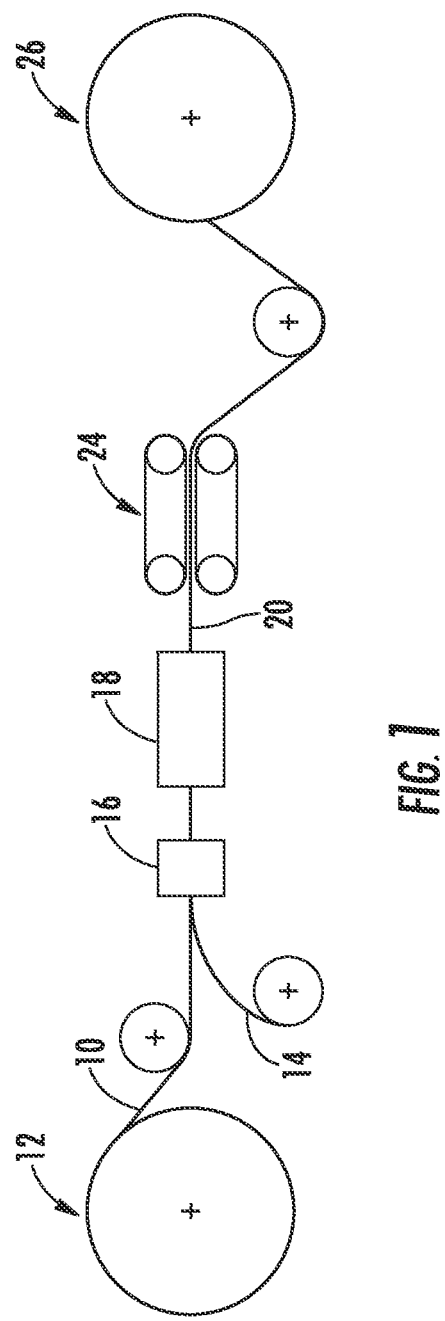
FIG. 1 is a schematic depiction of a final section of an optical fiber cable processing line, according to an illustrative embodiment.

Referring to FIG. 1, a schematic of an illustrative processing line for armoring and jacketing an optical fiber cable is depicted. In the embodiment depicted, the processing line starts with a cable core 10 contained on a payoff reel 12. The components of the cable core 10 can vary depending on the type of optical fiber cable being produced. For example, the cable core 10 can include a plurality of optical fibers contained within a buffer tube. The buffer tube may be wrapped in one or more layers of water blocking tape and/or flame retardant tape (e.g., mica tape). The cable core may also include strands of a strengthening material, such as fiberglass yarn or aramid fibers, wound around the underlying layers. In other embodiments, the cable core 10 may include a plurality of optical fibers contained within a plurality of buffer tubes that are stranded around a central strength member. In embodiments, the cable core 10 is assembled on a separate processing line, spooled, and then transported to the processing line of FIG. 1. However, in other embodiments, the cable core 10 could be assembled on the same processing line as the portion of the processing line shown in FIG. 1.

In embodiments, the cable core 10 is provided with an armor layer 14 that is formed around the cable core 10 in an armor-forming apparatus 16. The armor-forming apparatus 16 wraps the armor 14 around the cable core 10 to enclose the cable core 10 within the armor 14. After formation of the armor 14, the armored cable core 10 goes through an extruder 18 where a cable jacket is applied to the cable core 10 to produce the finished optical fiber cable 20. In certain embodiments, the cable core 10 is not provided with an armor layer 14 and instead goes straight through the extruder 18. After the cable jacket is cooled, the optical fiber cable 20 is pulled through a capstan 24. The capstan 24 provides the pulling force on the cable core 10 to pull it through the armor-forming apparatus 16 (if provided) and extruder 18 and feeds the optical fiber cable 20 onto a take-up reel, referred to herein as the "winding apparatus" 26, for winding onto a spool. In embodiments, the processing line may include another capstan that pulls the cable core 10 off the payoff reel 12. As mentioned above, the embodiment depicted in FIG. 1 is merely illustrative to provide context for a situation in which the winding apparatus may be used. However, the winding apparatus 26 may be used in other contexts related to optical fiber cable processing lines and/or in the processing lines for other long products, such as rope, cable, wire, etc.

Figure 2:
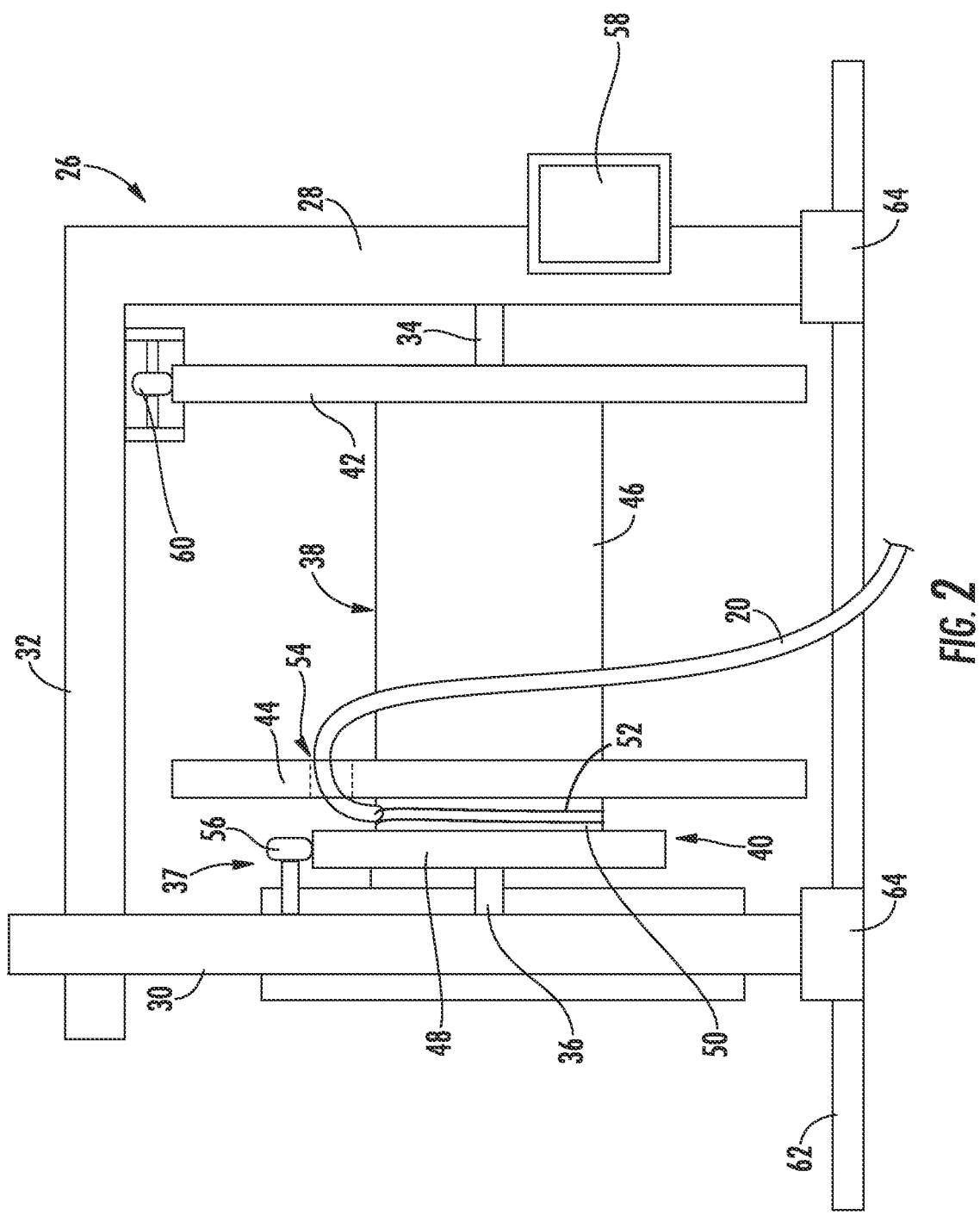
FIG. 2 depicts a take-up fiber reel for an optical fiber cable along with a tail section reel, according to an illustrative embodiment.

FIG. 2 depicts an illustrative embodiment of the winding apparatus 26 that can be used with the presently disclosed tail spool and in the presently disclosed winding method. In the embodiment depicted, the winding apparatus 26 includes a first vertical leg 28, a second vertical leg 30, and a cross-member 32. Although generally referred to herein as vertical, the vertical should be understood to be substantially upright when viewed in spatial relationship to the ground and/or other elements of the assembly. In embodiments, the second vertical leg 30 is movable relative to the first vertical leg 28 and the cross-member 32 so as to provide a larger or smaller space between the first vertical leg 28 and the second vertical leg 30. Extending inwardly from the first vertical leg 30 is a first pintle 34, and extending inwardly from the second vertical leg 30 is a second pintle 36. The pintles 34, 36 are configured to hold a main spool 38 and a tail spool 40. The pintles 34, 36 may have at least substantially aligned rotation axes. In this regard, the pintles 34, 36 may be collinear and define a common axis about which the main spool 38 and the tail spool 40 rotate. Additionally, in embodiments, the pintles 34, 36 travel up and down the vertical legs 28, 30 so as to pick up the main spool 38 from the ground for winding of the optical fiber cable 20. As will be understood by those of ordinary skill in the art from the present disclosure, winding apparatuses 26 having different designs may also be used with the disclosed tail spool and winding method.

The main spool 38 is comprised of a first flange 42 and a second flange 44 separated by a central barrel 46. During operation, the optical fiber cable 20 is wound onto the central barrel 46 of the main spool 38 between the flanges 42, 44. In embodiments, the flanges 42, 44 are circular discs having a diameter, e.g., of from 0.5 m to 3 m, and in embodiments the flanges 42, 44 are separated from each other by a distance, e.g., of from 0.35 m to 1.5 m. In embodiments, the central barrel 46 is cylindrical in shape having length corresponding to the distance between the flanges 42, 44 and a diameter, e.g., of from 0.3 m to 1.5 m. The main spool 38 can be made of a variety of suitable materials including, for example, wood, steel, plastic, etc. The dimensions of the main spool 38 provided are generally applicable to optical fiber cable production, but main spools 38 of other dimensions may be used depending on the particular product and size of the processing line involved.

In embodiments, the tail spool 40 is comprised of an outer flange 48 and a drum 50. In embodiments, the outer flange 48 has a diameter of from 0.4 m to 1.6 m. Further, in embodiments, the drum 50 is a ring that extends from a surface of the outer flange 48 (which can best be seen in FIG. 3). The outer diameter of the drum 50 is from 0.3 m to 1.5 m. In certain embodiments, the tail spool 40 has a constant diameter, i.e., the outer flange 48 and the drum 50 have the same diameter. In embodiments, the tail spool 40 is made from a metal to provide durability. In an embodiment, the tail spool 40 is made of aluminum because of aluminum's light weight compared to other metals. In another embodiment, the tail spool 40 is made of steel to handle long-term wear. The dimensions of the tail spool 40 provided are generally applicable to optical fiber cable production, but tail spools 38 of other dimensions may be used depending on the particular product and size of the processing line involved.

Prior to taking up the optical fiber cable 20 on the main spool 38, a portion of the optical fiber cable 20, i.e., a tail section, is wound onto the tail spool 40. As mentioned above, the tail section is provided outside of the main spool 38 to provide a section of optical fiber cable 20 for compliance and quality control testing. In order to wind the optical fiber cable 20 onto the tail spool 40, a lead wire 52 is unspooled from the tail spool 40, fed through an opening 54 in the second flange 44 of the main spool 38, and attached to an end of the optical fiber cable 20. In this way, when the tail spool 40 is rotated, the lead wire 52 will rewind onto the tail spool 40, pulling the optical fiber cable 20 through the opening 54 in the second flange 44 and onto the drum 50 of the tail spool 40. In embodiments, the lead wire 52 is a metal wire, such as braided steel, having diameter of from 1 mm to about 10 mm; however, the lead wire 52 can be made of other materials in other embodiments.

Figure 3:
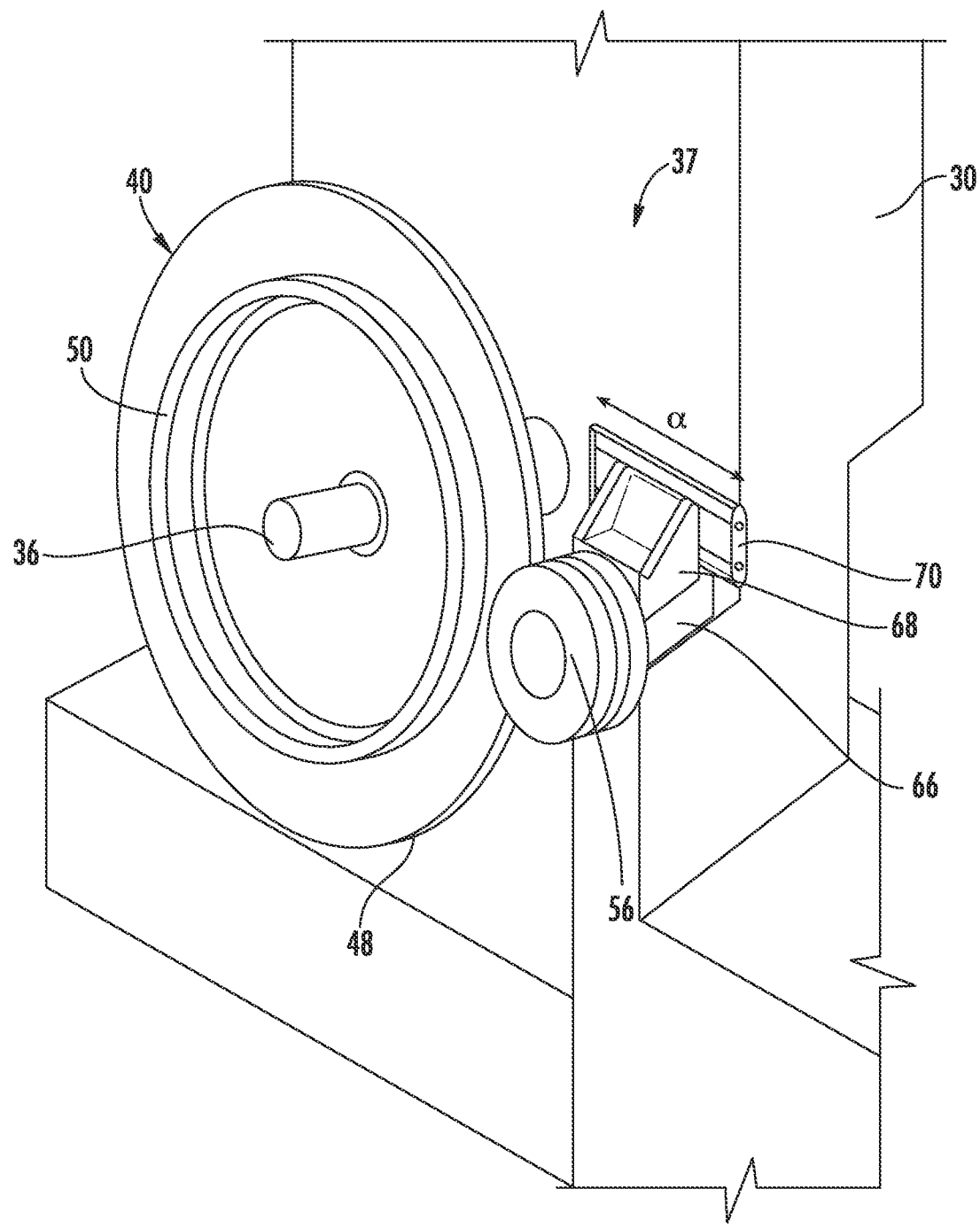
FIG. 3 depicts a view of the tail section reel, according to an illustrative embodiment.

During rotation, the tail spool 40 is rotated by a drive mechanism that includes a first drive wheel 56 that contacts the outer flange 48 when the tail spool 40 is engaged. The combination of the tail spool 40 and its drive mechanism is referred to as a tail reel 37. As can be seen in FIG. 2, the drive wheel 56 is mounted to the second vertical leg 30 in the embodiment depicted. Further, for clarity of illustration, the drive wheel 56 is shown as being on top of the outer flange 48, but the drive wheel 56 may be located at other locations around the perimeter of the outer flange 48 (e.g., to the rear of the outer flange 48 as shown in FIG. 3). The first drive wheel 56 rotates the tail spool 40 until a desired amount of tail section is wound onto the tail spool 40. In embodiments, the tail section is from 0.5 m to 15 m long. In other embodiments, the tail section is from 2 m to 10 m long, and in still other embodiments, the tail section is about 5 m long. Rotation of the tail spool 40 is controlled by a controller, depicted as a control panel 58. In embodiments, controller counts the number of revolutions of the tail spool 40 to achieve the desired winding of tail section, also taking into account the amount of lead wire 52 to rewind. During winding of the tail section, the tail spool 40 rotates independently of the main spool 38. That is, the tail spool 40 will be rotating, and the main spool 38 may not be rotating or will be rotating at a different rotational rate than the main spool 38.

After winding the desired amount of tail section, the controller will disengage the first drive wheel 56 (e.g., using a slidable mount as shown in FIG. 3) and will engage a drive mechanism of the main spool 38, depicted as a second drive wheel 60 that contacts the first flange 42 of the main spool 38. In other embodiments, the drive mechanism of the main spool 38 is not a second drive wheel 60, and instead, the main spool is driven by at least one of the pintles 34, 36. For example, one or both of the pintles 34, 36 may include a drive arm having a dog that engages and disengages a dog pin hole in the respective flange 42, 44 of the main spool 38 so that the drive arm is able to cause rotation of the main spool 38 (when engaged) about the axis defined by the pintles 34, 36. The remainder of the optical fiber cable 20 will then wind onto the central barrel 46 of the main spool 38 between the flanges 42, 44. To facilitate winding on the main spool 38, the take-up reel 26 may include a rail or rails 62 that are engaged by runners 64. In this way, the take-up reel 26 can translate relative to the capstan 24 (as shown in FIG. 1) to wind the optical fiber cable 20 in tight, orderly windings across the central barrel 46. During rotation of the main spool 38, the tail spool 40 may also rotate. In accordance with aspects of the present disclosure, the tail spool 40 may rotate together or at substantially the same rotational rate as the main spool 38 rotates.

FIG. 3 provides a more detailed view of the tail reel 37, including the tail spool 40 and the first drive wheel 56. As can be seen in FIG. 3, the tail spool 40 is carried on the second pintle 36 of the second vertical leg 30. Additionally, the first drive wheel 56 is driven by a motor 66 that is carried by a mount 68 on a track 70. In particular, the mount 68 is able to translate back and forth along line a of the track 70 to engage and disengage the first drive wheel 56 with the outer flange 48 of the tail spool 40. In embodiments, the mount 68 translates on the track 70 using, e.g., a linear electric actuator, a pneumatic actuator, or a hydraulic actuator.

Figure 4:
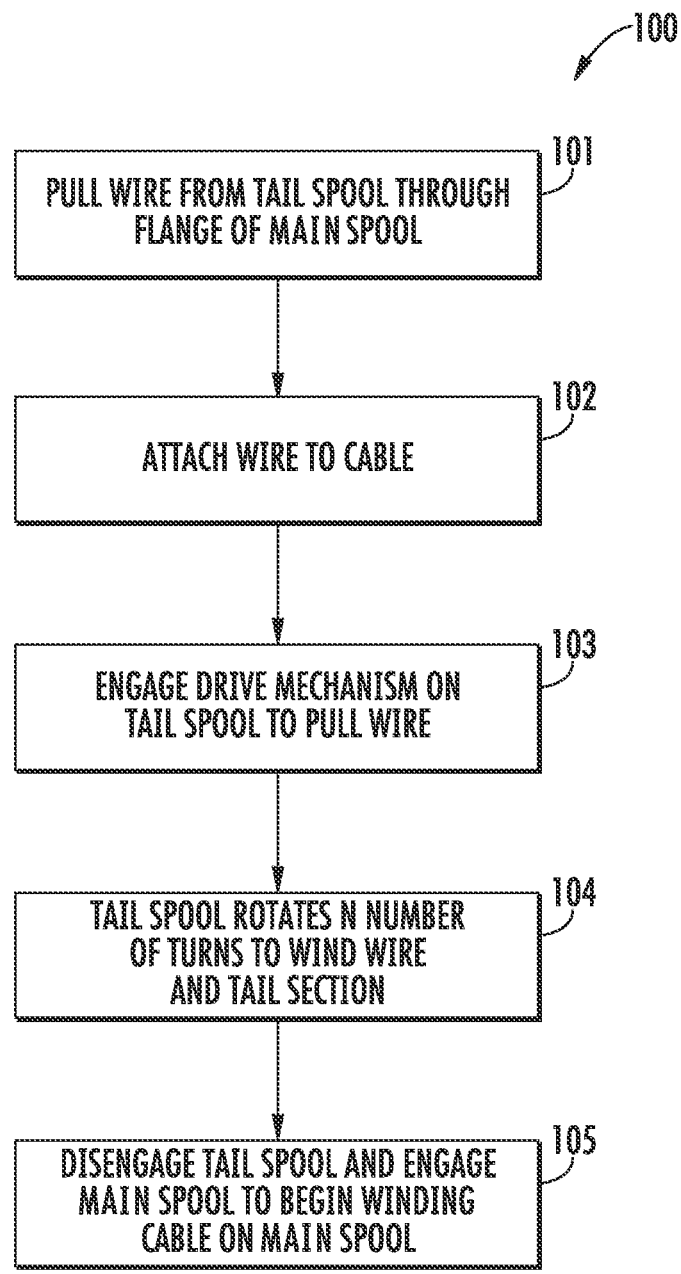
FIG. 4 depicts a process flow diagram for winding an optical fiber cable onto a winding apparatus, according to an illustrative embodiment.

FIG. 4 provides a flow diagram for a winding process 100. During the winding process, in a first step 101, the lead wire is pulled from the tail spool through the flange of the main spool. In a second step 102, the lead wire is attached to optical fiber cable that is being indexed from the exit capstan. The lead wire can be attached, for example, using typical cable pulling grips that are used during cable installation. In step 103, the drive mechanism for the tail spool is engaged, and the tail spool begins to rewind the lead wire. In step 104, the tail spool rotates N number of times to fully rewind the lead wire and to wind a desired amount of tail section. In step 105, the tail spool is disengaged, and the main spool is engaged so that the optical fiber cable can continue to wind on the main spool. In general, engaging the drive mechanism of the main spool will not produce sufficient force to cause the tail spool to unwind. However, in certain embodiments, the tail spool is locked to the main spool to prevent unwinding of the tail section from the tail spool. For example, locking the tail spool to the main spool can be accomplished by inserting one or more pins through the outer flange 48 of the tail spool 40 and into the second flange 44 of the main spool 38, synchronizing the rotation of the tail spool 40 and the main spool 38 (e.g., by synchronizing their drive mechanisms), or securing the tail section to the tail spool 40 so that the tail section cannot unwind and so that the tail spool 40 and the main spool 38 co-rotate.

Upon completion of winding, in embodiments, the tail section is removed from the tail spool and secured to the main spool, such as to the outside of the second flange, and the tail spool is reused for additional winding operations. In other embodiments, the tail spool, still containing the tail section, is secured to the main spool so that the tail section is secured to the mail spool via the tail spool. In such embodiments, the tail spool may be made of a disposable and/or low cost material, e.g., plastic or wood. Generally, in any of the embodiments, the lead wire and cable pulling grip may be reused for multiple winding operations.

Advantageously, the tail spool apparatus and method of using same as described herein allow for faster start-up times during the cable winding process. Previously, two operators were required to secure a tail section of the optical fiber cable during a winding process. One operator would acquire the cable from the capstan 24 (e.g., as shown in FIG. 1) and feed the cable through the flange of the main spool, and both operators would wrap the tail section into loops and zip-tie the tail section to the main spool to prevent the tail section from being pulled back through the flange during winding. While the tail section was being gathered in this way, the cable could not be wound on the main spool, but the capstan would still be indexing cable, which creates excess loose cable that the operators would have to organize so that the take-up reel could eventually wind the cable. By using the tail spool and lead wire as disclosed herein, a tail section of optical fiber cable can easily be preserved while preventing the accumulation of excess loose cable by automatically winding the cable onto the spools. Additionally, the winding method as disclosed herein involves fewer operator interactions and provides more reliable and consistent threading practice. Using the disclosed tail spool and winding method, only a single operator is needed to unwind the lead wire and attach it to the optical fiber cable being indexed from the capstan. Thereafter, the controller automatically winds the desired amount of tail section and switches over to the main spool. As such, the winding process can have a shorter ramp up time than the previous process.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of collecting a tail section of a long product, comprising the steps of:
   unwinding a lead wire from a tail spool;
   feeding the lead wire through a flange of a main spool, the tail spool and the main spool having at least substantially aligned rotation axes;
   attaching the lead wire to the long product;
   rotating the tail spool while holding the main spool substantially stationary so as to wind the lead wire and the tail section of the long product onto the tail spool;
   stopping or reducing rotation of the tail spool; and
   rotating the main spool and the tail spool together so as to wind the long product onto the main spool.

2. The method of claim 1, wherein the long product is an optical fiber cable.

3. The method of claim 1, wherein the tail section comprises the first 0.5 m to 15 m of the long product.

4. The method of claim 1, wherein the step of rotating the tail spool comprises engaging a drive wheel with an outer flange of the tail spool.

5. The method of claim 1, further comprising the step of counting a number of rotations of the tail spool, and wherein the step of stopping rotating of the tail spool comprises stopping rotating of the tail spool when a predetermined number of rotations of the tail spool has been reached.

6. The method of claim 1, wherein, after the long product is wound onto the main spool, the method further comprises removing the tail section from the main spool and attaching the tail section to the flange of the main spool.

7. The method of claim 1, wherein, after the long product is wound onto the main spool, the method further comprises securing the tail spool containing the tail section to the main spool.

8. The method of claim 1, wherein, after the first rotating step, the tail section is wound between a flange of the tail spool and the flange of the main spool.

9. The method of claim 1, wherein the step of rotating the main spool and the tail spool together further comprises locking rotation of the tail spool to the main spool.

10. The method of claim 1, wherein the tail spool and the main spool have a common rotation axis.

11. The method of claim 10, wherein the step of rotating the main spool and the tail spool together comprises rotating the main spool and the tail spool at substantially the same rotational rate.

12. A winding apparatus, comprising:
   a first upright leg;
   a second upright leg spatially disposed from the first upright leg;
   a first pintle extending from the first upright leg towards the second upright leg;
   a second pintle extending from the second upright leg towards the first upright leg, the first pintle and the second pintle defining an axis of rotation;
   a main spool carried on the first pintle and on the second pintle and configured for rotation about the axis of rotation;
   a tail spool carried on the second pintle and configured for rotation about the axis of rotation; and
   a controller configured to cause rotation of the tail spool independent of the main spool to take up a tail section of an optical fiber cable and to cause rotation of the main spool to take up windings of the optical fiber cable.

13. The winding apparatus of claim 12, further comprising a first drive wheel controlled by the controller, the first drive wheel configured to drive rotation of the tail spool.

14. The winding apparatus of claim 13, wherein the first drive wheel resides on a mount configured to translate into contact with the tail spool to drive rotation of the tail spool and out of contact with the tail spool to stop driving rotation of the tail spool.

15. The winding apparatus of claim 12, wherein the tail spool comprises an outer flange having a first diameter and a drum having a second diameter, the second diameter being less than the first diameter;
   wherein the main spool comprises a first flange, a second flange, and a central barrel disposed between the first flange and the second flange, the first flange and the second flange having a third diameter and the central barrel having a fourth diameter less than the third diameter; and
   wherein the drum of the tail spool is disposed between outer flange of the tail spool and the second flange of the main spool.

16. The winding apparatus of claim 12, wherein the controller automatically switches between causing rotation of the tail spool and causing rotation of the main spool after the tail spool has taken up the tail section.

17. The winding apparatus of claim 12, wherein the controller is configured to count the number of rotations of the tail spool and to stop the tail spool from rotating independently of the main spool when a predetermined number of rotations of the tail spool has been reached.

* * * * *